(12) United States Patent
Ikehata

(10) Patent No.: US 11,502,313 B2
(45) Date of Patent: Nov. 15, 2022

(54) FUEL CELL

(71) Applicant: TOYOTA JIDOSHA KABUSHIKI KAISHA, Toyota (JP)

(72) Inventor: Yuta Ikehata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 17/323,218

(22) Filed: May 18, 2021

(65) Prior Publication Data

US 2021/0376338 A1 Dec. 2, 2021

(30) Foreign Application Priority Data

May 28, 2020 (JP) .............................. JP2020-093474

(51) Int. Cl.

| | | |
|---|---|---|
| *H01M 8/0273* | (2016.01) | |
| *H01M 8/1004* | (2016.01) | |
| *H01M 8/242* | (2016.01) | |
| *H01M 8/0202* | (2016.01) | |
| *H01M 8/10* | (2016.01) | |

(52) U.S. Cl.
CPC ....... *H01M 8/0273* (2013.01); *H01M 8/1004* (2013.01); *H01M 8/242* (2013.01); *H01M 8/0202* (2013.01); *H01M 2008/1095* (2013.01)

(58) Field of Classification Search
None
See application file for complete search history.

(56) References Cited

U.S. PATENT DOCUMENTS

2005/0175882 A1\* 8/2005 Sasahara ............. H01M 8/0267
429/510

FOREIGN PATENT DOCUMENTS

JP 2017126448 A 7/2017

\* cited by examiner

*Primary Examiner* — Alix E Eggerding
(74) *Attorney, Agent, or Firm* — Dickinson Wright, PLLC

(57) ABSTRACT

A fuel cell capable of reducing the stress exerted upon an electrolyte membrane resulting from the swelling and contraction of the electrolyte membrane. The fuel cell includes at least an MEGA with catalyst layers joined to the opposite sides of the electrolyte membrane, and a pair of separators disposed so as to sandwich the MEGA. The MEGA generates power with a hydrogen gas fed to one side of the MEGA and with an oxidant gas fed to the other side. Separators each have a plurality of projections formed on the side of the MEGA so as to form a gas channel through which the hydrogen gas or oxidant gas flows between the projections. The electrolyte membrane has a plurality of through-holes formed at positions facing the projections along the direction in which the projections extend.

4 Claims, 4 Drawing Sheets

FUEL CELL

CROSS REFERENCE TO RELATED APPLICATIONS

The present application claims priority from Japanese patent application JP 2020-093474 filed on May 28, 2020, the entire content of which is hereby incorporated by reference into this application.

BACKGROUND

Technical Field

The present disclosure relates to a fuel cell that includes at least an assembly having an electrolyte membrane with catalyst layers joined to the opposite sides of the electrolyte membrane, and a pair of separators disposed so as to sandwich the assembly.

Background Art

The conventional polymer electrolyte fuel cell has a structure in which a plurality of fuel cells is stacked. Each fuel cell includes a membrane electrode assembly having an ion-permeable electrolyte membrane, and an anode catalyst layer and a cathode catalyst layer that are joined so as to sandwich the electrolyte membrane (see, for example, JP 2017-126448 A). Gas diffusion layers are formed on the opposite sides of the membrane electrode assembly. The gas diffusion layers are adapted to feed a fuel gas or an oxidant gas to the assembly and collect electricity generated through an electrical chemical reaction. The membrane electrode assembly having the gas diffusion layers disposed on its opposite sides is referred to as a membrane electrode and gas diffusion layer assembly (MEGA), which is sandwiched by a pair of separators.

In the membrane electrode assembly, a hydrogen gas is fed to the anode catalyst layer and an oxidant gas (air) is fed to the cathode catalyst layer. The hydrogen is oxidized to proton in the anode catalyst layer and the oxygen is reduced to water in the cathode catalyst layer, so that the power is generated.

SUMMARY

However, the electrolyte membrane of the fuel cell shown in JP 2017-126448 A repeatedly gets dry and wet due to production and movement of water within the membrane electrode assembly, which causes the electrolyte membrane more likely to swell and contract in the surface direction (the direction orthogonal to the thickness direction of the electrolyte membrane). When swelling occurs in a portion of the electrolyte membrane where deformation in the surface direction is not restricted, the portion deforms so as to swell and is expected to repeatedly receive bending stress. This could result in a shorter life time of the electrolyte membrane.

The present disclosure has been made in view of the foregoing, and provides a fuel cell capable of reducing the stress exerted upon the electrolyte membrane resulting from the swelling and contraction of the electrolyte membrane.

In view of the foregoing, the fuel cell according to the present disclosure includes at least an assembly having an electrolyte membrane with catalyst layers joined to the opposite sides of the electrolyte membrane, and a pair of separators disposed so as to sandwich the assembly. The fuel cell generates power in the assembly with a hydrogen gas fed to one side of the assembly and with an oxidant gas fed to the other side of the assembly. The separators each have a plurality of projections formed on the side of the assembly so as to form a gas channel through which the hydrogen gas or the oxidant gas flows between the projections. The electrolyte membrane has a plurality of through-holes formed at positions facing the projections along the direction in which the projections extend.

According to the present disclosure, the electrolyte membrane has the plurality of through-holes formed at positions facing the projections along the direction in which the projections extend. With such a configuration, even if the electrolyte membrane swells and contracts in the surface direction (the direction orthogonal to the thickness direction of the electrolyte membrane) when the fuel cell generates power, the deformation can be absorbed by the plurality of through-holes. Consequently, the stress exerted upon the electrolyte membrane resulting from the swelling and contraction of the electrolyte membrane can be reduced. Further, the through-holes are formed at the positions facing the projections, so that the hydrogen gas and the oxidant gas flowing through the gas channels can be prevented from flowing through the through-holes and those gases moving toward the through-holes can be reacted in the catalyst layers. Thus, the deterioration of the power generation efficiency of the fuel cell resulting from the gases flowing through the through-holes can be suppressed.

In some embodiments, the assembly has a rectangular power generating region in which the catalyst layers are formed so as to sandwich the electrolyte membrane. The power generating region has long sides and short sides. The plurality of projections is disposed along the long side direction of the power generating region.

According to this embodiment, although the electrolyte membrane is more likely to swell and contract in the long side direction than in the short side direction of the power generating region, since the plurality of projections is disposed along the long side direction of the power generating region and the plurality of through-holes is also formed along the long side direction accordingly, the deformation of the electrolyte membrane due to the swelling and contraction can be efficiently suppressed.

In another embodiment, the assembly has the power generating region and a non-power generating region that surrounds the power generating region. The fuel cell has a resin frame in the non-power generating region. The resin frame is bonded to the assembly so as to surround the power generating region. A plurality of through-holes is further formed on the inner side of the electrolyte membrane along the inner peripheral edge of the resin frame.

According to this embodiment, although the electrolyte membrane is more likely to deform due to the swelling and contraction at positions on the inner side along the inner peripheral edge of the resin frame, since the plurality of through-holes is formed at these positions, the deformation of the electrolyte membrane due to the swelling and contraction can be efficiently suppressed.

In yet another embodiment, the through-holes each have a pore size of 50 μm or smaller. According to this embodiment, the through-holes each have a pore size of 50 μm or smaller, so that the hydrogen gas and the oxidant gas can be prevented from flowing through these through-holes.

DETAILED DESCRIPTION

1. Regarding Fuel Cell Stack 1

A fuel cell stack 1 according to the present embodiment includes a plurality of fuel cells 10 stacked, each fuel cell (hereinafter referred to as a "unit cell") 10 being a basic unit. The unit cell 10 is a polymer electrolyte fuel cell that generates the electromotive force through an electrical chemical reaction between an oxidant gas contained in the air and a hydrogen gas as a fuel gas. The air (oxidant gas) refers to the atmosphere. The air compressed by a compressor, for example, and a hydrogen gas filled in a high-pressure tank are fed to the fuel cell stack 1.

Figure 1:
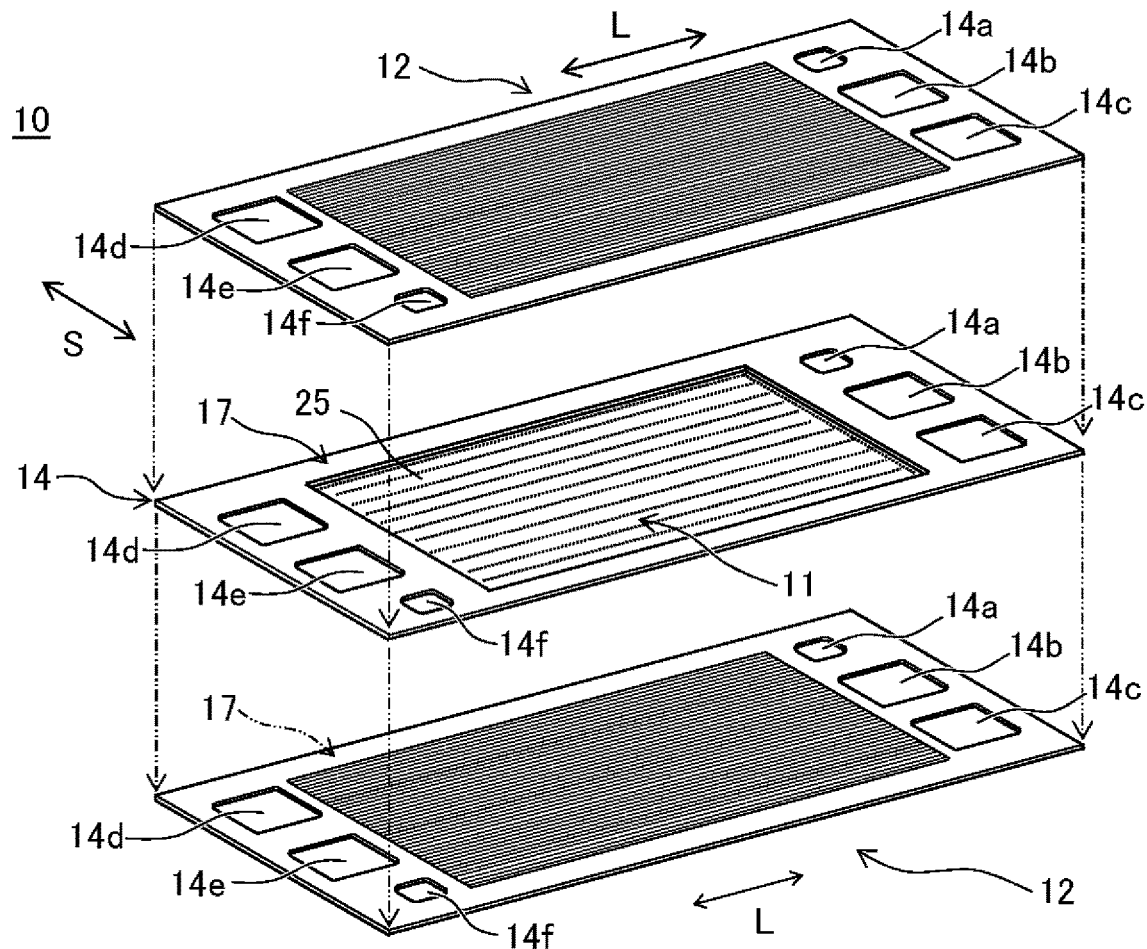
FIG. 1 is an exploded perspective view of a fuel cell according to an embodiment of the present disclosure.
Figure 2:
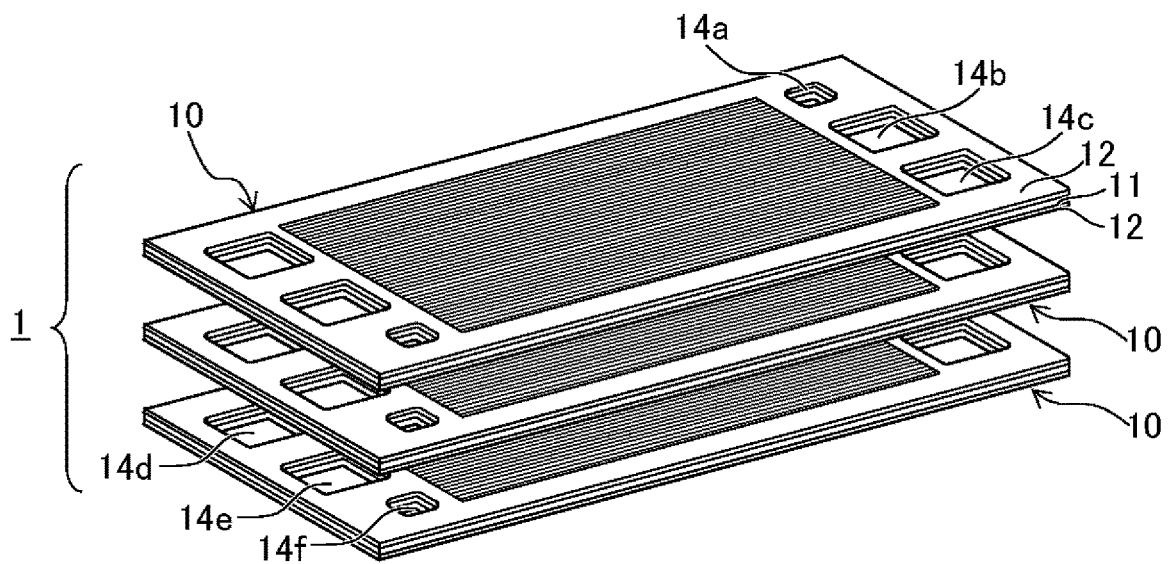
FIG. 2 is a perspective view of a fuel cell stack in which the fuel cells illustrated in FIG. 1 are stacked.
Figure 3:
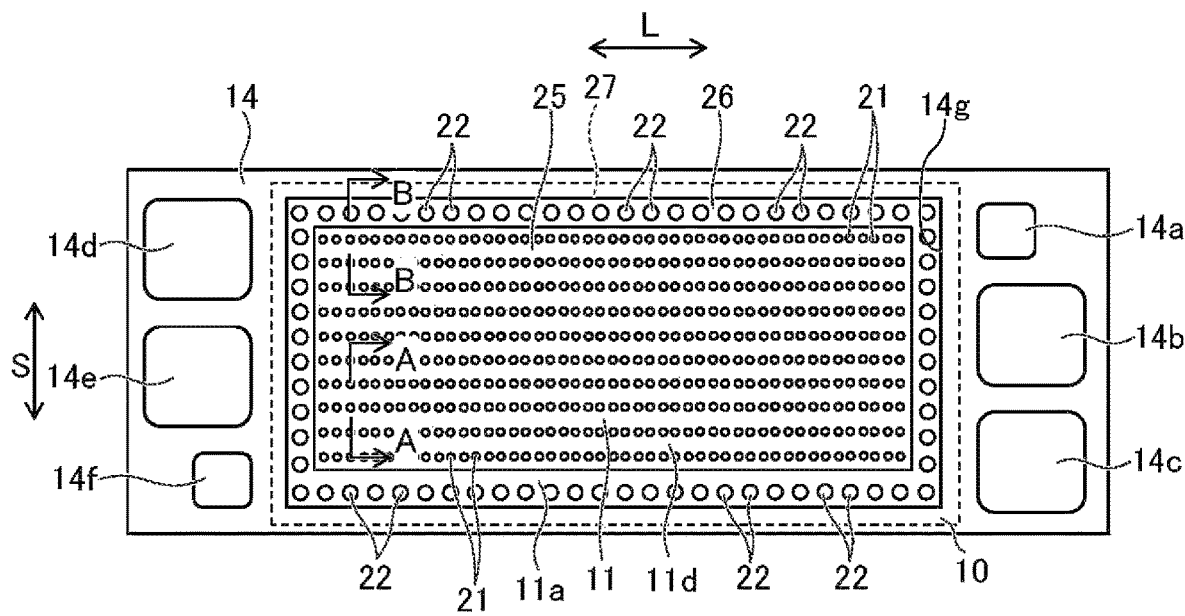
FIG. 3 is a plan view of a power generation assembly including an assembly of the fuel cell illustrated in FIG. 1.

As illustrated in FIG. 1 to FIG. 3, the unit cells 10 that form the fuel cell stack 1 each include a power generation assembly 17 and a pair of separators 12 disposed so as to sandwich the power generation assembly 17. The power generation assembly 17 includes an electrode and gas diffusion layer assembly (MEGA) 11 and a resin frame 14 that surrounds the outer periphery of the MEGA 11. The MEGA 11 of the unit cell 10 generates power with the hydrogen gas fed to one side of the MEGA 11 and with the air fed to the other side.

Figure 5:
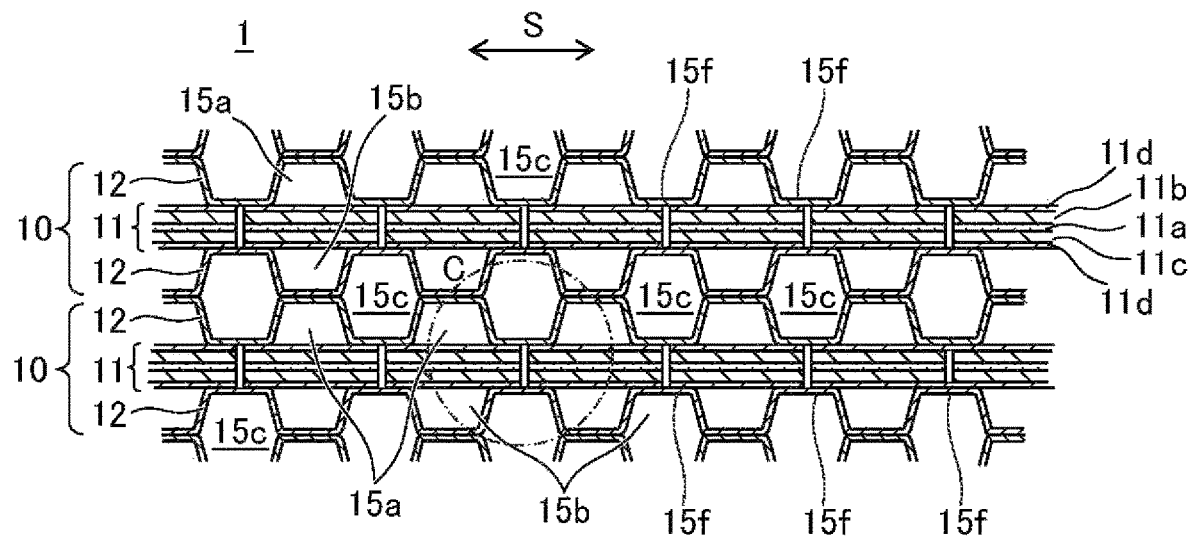
FIG. 5 is a cross-sectional view of FIG. 3 as viewed in a direction indicated by an arrow A-A.
Figure 6:
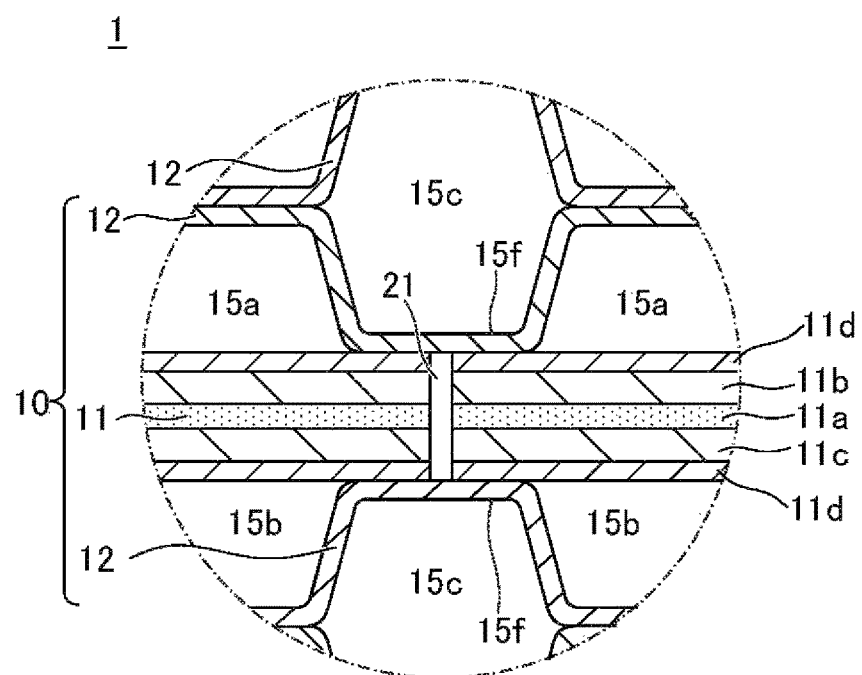
FIG. 6 is an enlarged view of a main part C of the fuel cell illustrated in FIG. 5.
Figure 7:
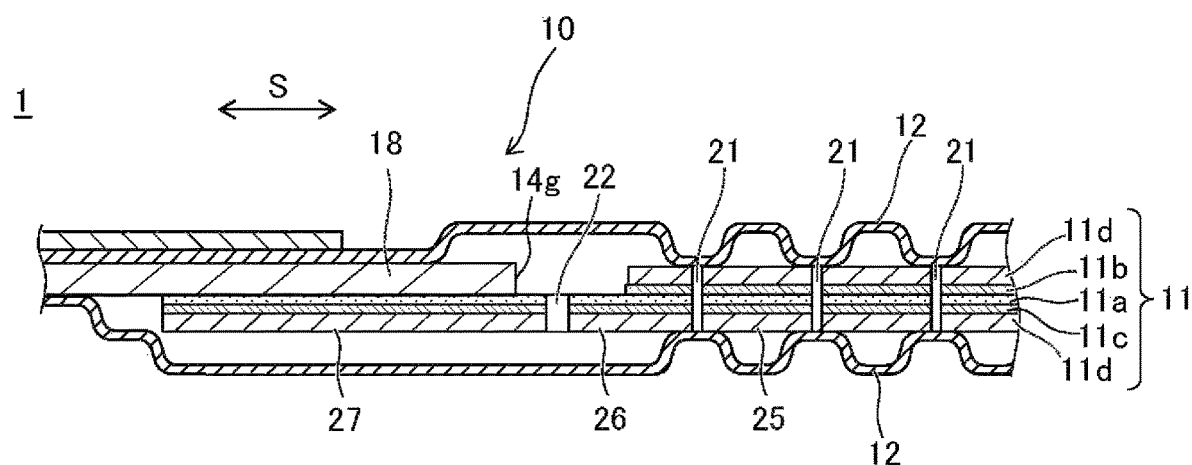
FIG. 7 is a cross-sectional view of a unit cell illustrated in FIG. 3 as viewed in a direction indicated by an arrow B-B.

As illustrated in FIG. 5 and FIG. 6, the MEGA 11 includes an electrolyte membrane 11a, catalyst layers 11b and 11c joined to the opposite sides of the electrolyte membrane 11a, and gas diffusion layers 11d joined to the catalyst layers 11b and 11c.

The MEGA 11 of the present embodiment corresponds to the "assembly" of the present disclosure. In the unit cell without the gas diffusion layers 11d, for example, the electrolyte membrane 11a with the catalyst layers 11b and 11c joined thereto (so-called membrane electrode assembly) corresponds to the "assembly" of the present disclosure.

Figure 4:
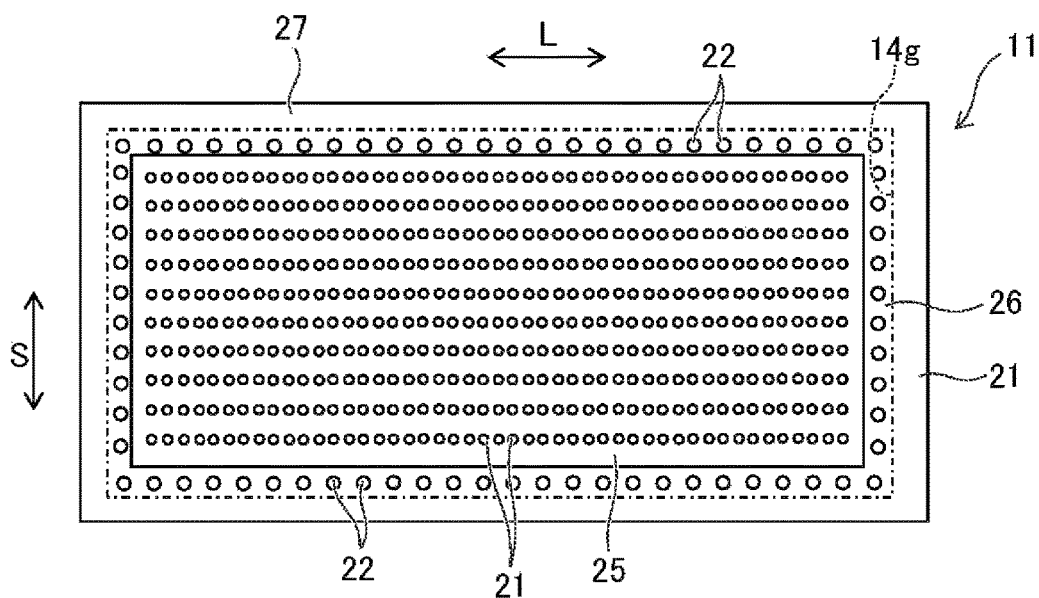
FIG. 4 is a plan view of an MEGA illustrated in FIG. 1.

In the present embodiment, a rectangular region of the MEGA 11, where the catalyst layers 11b and 11c are formed so as to sandwich the electrolyte membrane 11a, is a power generating region 25 of the unit cell 10 (see FIG. 3 and FIG. 5). The power generating region 25 has long sides and short sides. FIG. 3 and FIG. 4 represent the long side direction of the power generating region 25 as L and the short side direction as S. Projections 15f of the separators 12, which will be described later, contact the power generating region 25 along the long side direction L.

The MEGA 11 includes the power generating region 25 and a non-power generating region 26 surrounding the power generating region 25. The MEGA 11 is bonded to the resin frame 14 in a bonding region 27 of the non-power generating region 26.

The configuration of the MEGA 11 will be described. The MEGA 11 including the electrolyte membrane 11a has formed therein through-holes 21 and 22, which will be described in detail later. The electrolyte membrane 11a is a proton-conductive ion-exchange membrane made of a solid polymer material. Examples of the electrolyte membrane 11a include a thin film of a perfluorosulfonic acid polymer, and may also include fluorocarbon resin, such as polytetrafluoroethylene (PTFE), tetrafluoroethylene-hexafluoropropylene copolymer (FEP), and tetrafluoroethylene-perfluoroalkylvinylether copolymer (PFA), since they are highly water-repellent. The thickness of the electrolyte membrane 11a is in the range of 1 to 100 μm, for example, and may be in the range of 10 to 50 μm.

The catalyst layers 11b and 11c contain carbon particles that carry a catalyst and a polymer electrolyte (ionomer) as a proton conducting pathway. As the ionomer, a perfluoro-based proton exchange resin of a fluoroalkyl copolymer, which is a polymer electrolyte having a proton conductivity and a fluoroalkyl ether side chain and a perfluoroalkyl main chain, may be used. Examples of the carbon particles include carbon material such as carbon black, carbon nanotube, carbon nanofiber, or mesoporous carbon. Examples of the catalyst include catalyst metals such as platinum, platinum alloy, and palladium. In the present embodiment, the catalyst layer 11b disposed on one side of the electrolyte membrane 11a is the anode catalyst layer of the unit cell 10 and the catalyst layer 11c on the other side is the cathode catalyst layer of the unit cell 10. The thickness of each of the catalyst layers 11b and 11c is in the range of 0.1 to 50 μm, for example, and may be in the range of 1 to 10 μm.

The gas diffusion layer 11d is a gas-permeable conductive member, such as a carbon porous body, for example, carbon paper and carbon cloth, or a metal porous body, for example, a metal mesh and a foam metal. The thickness of the gas diffusion layer 11d is in the range of 30 to 500 μm, for example, and may be in the range of 100 to 250 μm.

The resin frame 14 has a three-layer sheet structure of a main layer as a frame body made of a thermoplastic resin or a thermosetting resin, and bonding layers made of a thermoplastic resin formed on the opposite sides of the main layer. The resin frame 14 is fused with the separators 12 by melting (softening) the bonding layers of the resin frame 14. The resin frame 14 has an opening in its middle portion so as to surround a region including the power generating region 25 and a part of the non-power generating region 26 surrounding the power generating region 25 of the MEGA 11. The resin frame 14 is fused with one side of the MEGA 11 (specifically, the surface of the electrolyte membrane 11a). In this manner, the power generating region 25 of the MEGA 11 is joined so as to be sandwiched by the pair of separators 12.

In the present embodiment, six manifold openings (flow ports) are formed on the opposite end portions of the resin frame 14. The manifold openings are adapted to feed the hydrogen gas, air (oxidant gas), and cooling water separately to the MEGA 11 or its nearby areas and discharge the fed hydrogen gas, air, and cooling water from the MEGA 11 or its nearby areas.

Specifically, a hydrogen flow port 14a for the flow of the hydrogen gas, cooling water flow port 14b for the flow of the cooling water, and an air flow port 14c for the flow of the air are provided in this order on one end portion of the resin frame 14, and an air flow port 14d for the flow of the air, a cooling water flow port 14e for the flow of the cooling water, and a hydrogen flow port 14f for the flow of the hydrogen gas are provided in this order on the other end portion of the resin frame 14.

One of the manifold openings (flow ports) as a pair through which each fluid flows is a flow port for feeding the fluid to the MEGA 11 or its nearby areas and the other of the pair is a flow port for discharging the fluid from the MEGA 11 or its nearby areas. For example, the hydrogen flow port 14a as one of the pair is a flow port for feeding the hydrogen gas to the MEGA 11, while the hydrogen flow port 14f as the other of the pair is a flow port for discharging the hydrogen gas from the MEGA 11. Since the hydrogen flow port 14a and hydrogen flow port 14f are diagonally arranged in the resin frame 14, the hydrogen gas can diagonally flow across the power generating region 25.

Each separator 12 is a member having a rectangular shape in plan view and formed from a thin plate material or foil material made of metal, such as stainless steel, titanium, and titanium alloy. The thickness of the separator 12 is from 10 to 200 μm, for example. The thin plate material or foil material of the separator 12 is formed through cold rolling or the like. The separator 12 is formed into a predetermined shape by press-molding the thin plate material or foil material. The press-molded material is used as a substrate of the separator 12, and a carbon film or the like may be further formed on the surface of the substrate. The carbon film may be formed either before or after the separator 12 is press-molded.

The separator 12 is a plate-like member including a substrate of a metal excellent in conductivity, gas-permeability, and the like. The separator 12 has a wavelike shape in an isogonal trapezoid. One side of the separator 12 contacts the MEGA 11 (gas diffusion layer 11d), and the other side contacts one side of the adjacent separator 12.

The plurality of projections 15f are formed on the MEGA 11 side of the separator 12, so that gas channels (gas channel grooves) 15a and 15b through which the hydrogen gas and air flow are formed between the projections 15f. On the back side (reverse side) of each projection 15f of the separator 12, a flow channel 15c through which the cooling water flows is formed. In the present embodiment, the projections 15f are disposed along the long side direction L of the power generating region 25 of the MEGA 11. More specifically, the projections 15f contact the MEGA 11 without being bonded thereto.

With such a configuration, the gas channel 15a for the flow of the hydrogen gas is formed between the MEGA 11 and the separator 12 on one side (anode side) of the MEGA 11, and the gas channel 15b for the flow of the air is formed between the MEGA 11 and the separator 12 on the other side (cathode side) of the MEGA 11. The flow channel 15c for the flow of a refrigerant (for example, water) for cooling the unit cell 10 is formed between the separators 12 and 12 in surface contact with each other of the adjacent two unit cells 10. Feeding the fuel gas to the gas channel 15a and the air to the gas channel 15b triggers the electrical chemical reaction within the unit cell 10 to generate the electromotive force. The electrical chemical reaction produces proton ($H^+$) and water in the catalyst layer 11b on the anode side to cause them to permeate the electrolyte membrane 11a in a hydrated state, and produces water in the catalyst layer 11c on the cathode side.

The separator 12 is in the same rectangular shape in plan view as that of the power generation assembly 17. Six manifold openings (flow ports) are formed on the opposite end portions in the long side direction of the separator 12, as with the resin frame 14. These flow ports are formed at positions corresponding to the flow ports of the resin frame 14 in the same sizes as those of their respective flow ports. FIG. 1 denotes the flow ports of the separator 12 by the same reference numerals as those of their respective flow ports of the resin frame 14.

Specifically, the hydrogen flow port 14a for the flow of the hydrogen gas, the cooling water flow port 14b for the flow of the cooling water, and the air flow port 14c for the flow of the air are formed in this order on one end portion of the separator 12, and the air flow port 14d for the flow of the air, the cooling water flow port 14e for the flow of the cooling water, and the hydrogen flow port 14f for the flow of the hydrogen gas are formed in this order on the other end portion of the separator 12.

In this manner, one of the manifold openings (flow ports) as a pair through which each fluid flows is a flow port for feeding the fluid to the MEGA 11 or its nearby areas and the other of the pair is a flow port for discharging the fluid from the MEGA 11 or its nearby areas. With this configuration, the hydrogen gas, air, and cooling water each can be fed to the unit cell 10 through each flow port to flow through their respective flow channels 15a, 15b, and 15c of the unit cell 10, and discharged from the unit cell 10 through each flow port.

In the present embodiment, as illustrated in FIG. 1 to FIG. 4, the plurality of through-holes 21 (first through-holes) is formed in the electrolyte membrane 11a at the positions where they face the projections 15f of the separator 12 along the direction in which the projections 15f extend. The plurality of through-holes 21 is formed by drilling the electrolyte membrane 11a, which is a non-porous membrane. As illustrated in FIG. 5 and FIG. 6, in the present embodiment, the through-holes 21 extend through the catalyst layers 11b and 11c and gas diffusion layers 11d as well as the electrolyte membrane 11a. Further, the gas diffusion layers 11d are formed where they face the projections 15f, and the projections 15f contact the gas diffusion layers 11d so as to occlude the through-holes 21.

A plurality of through-holes 22 (second through-holes) is further formed on the inner side of the electrolyte membrane 11a along an inner peripheral edge 14g of the resin frame 14. Specifically, the plurality of through-holes 22 is formed so as to surround the power generating region 25 at positions of the non-power generating region 26, which are not restrained by the resin frame 14.

In the present embodiment, the through-holes 21 and 22 each has a circular pore, but the shape is not limited thereto. The pore size (diameter) of each of the through-holes 21 and 22 is 50 μm or smaller, and may be 39 μm or smaller. Further, the pore size of each of the through-holes 21 and 22 may be 1 μm or greater considering the processability, and may be 15 μm or greater. In addition, in the present embodiment, the pore size of the through-hole 22 is larger than that of the through-hole 21. FIG. 5 and FIG. 6 are enlarged schematic views of the through-holes 21 and 22 to clearly show their positions.

As described above, the through-holes 21 and 22 each have a pore size of 50 μm or smaller, so that the hydrogen gas and air can be prevented from flowing through these through-holes 21 and 22. Further, since the pore size of the through-hole 22 formed in the non-power generating region 26 is larger than that of the through-hole 21 formed in the power generating region 25, the impact of the through-holes 21 and 22 on the power generation can be suppressed. Such through-holes 21 and 22 may be formed through, for example, irradiation of the MEGA 11 with a laser beam or mechanical drilling of the MEGA 11 with a needle or the like.

According to the present embodiment, with the through-holes 21 provided, even if the electrolyte membrane 11a swells and contracts in the surface direction (the direction orthogonal to the thickness direction of the electrolyte membrane 11a) when the unit cell 10 generates power, the deformation can be absorbed by the plurality of through-holes 21. Consequently, the stress exerted upon the electrolyte membrane 11a resulting from the swelling and contraction of the electrolyte membrane 11a can be reduced.

Further, the through-holes 21 are formed at the positions facing the projections 15f, so that the hydrogen gas and the air flowing through the gas channels 15a and 15b can be prevented from flowing through the through-holes 21 and the hydrogen gas and the air moving toward the through-holes 21 can be reacted in the catalyst layers 11b and 11c. Thus, the deterioration of the power generation efficiency of the unit cell 10 resulting from the hydrogen gas and the air flowing through the through-holes 21 can be suppressed.

Furthermore, in the present embodiment, the plurality of projections 15f is disposed along the long side direction L of the power generating region 25 and the plurality of through-holes 21 is also formed along the long side direction L of the power generating region 25 accordingly. Therefore, although the electrolyte membrane 11a is more likely to swell and contract in the long side direction L than in the short side direction S of the power generating region 25, the deformation of the electrolyte membrane 11a due to the swelling and contraction can be efficiently suppressed.

Figure 8:
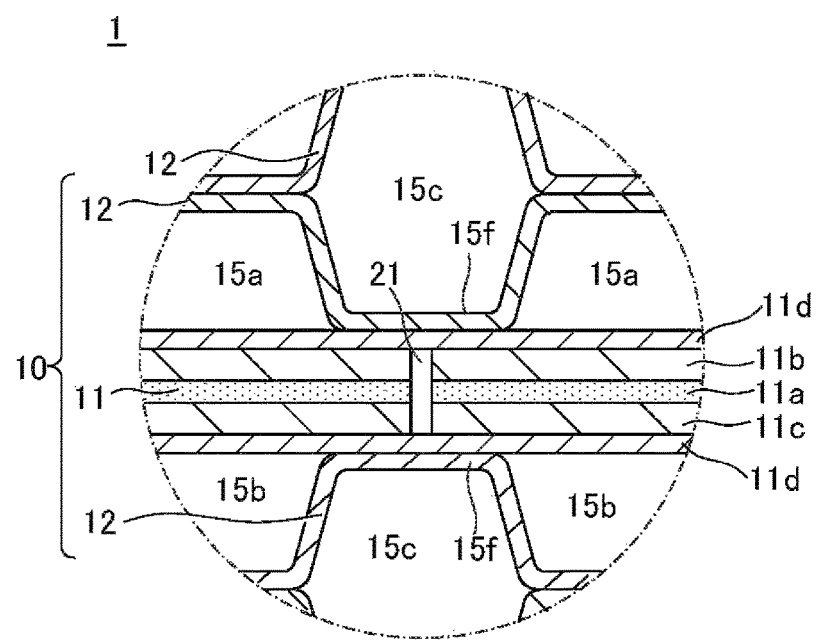
FIG. 8 is a view of a modification of the fuel cell of FIG. 5, showing the part corresponding to FIG. 6.

As long as the stress exerted upon the electrolyte membrane 11a resulting from the swelling and contraction of the electrolyte membrane 11a can be reduced, as described above, the through-holes 21 may be formed so as to extend through the electrolyte membrane 11a and catalyst layers 11b and 11c as illustrated in FIG. 8 or only in the electrolyte membrane 11a.

Further, although the electrolyte membrane 11a is more likely to deform due to the swelling and contraction at positions on the inner side along the inner peripheral edge 14g of the resin frame 14, since the plurality of through-holes 22 is formed at these positions, the deformation of the electrolyte membrane 11a due to the swelling and contraction can be efficiently suppressed. It should be noted that as long as such an advantageous effect can be exhibited, the through-holes 21 may only be provided without the through-holes 22.

The embodiment of the present disclosure has been described in detail, but the present disclosure is not limited thereto, and various design changes may be made within the scope described in the claims without departing from the spirit of the present disclosure.

What is claimed is:

1. A fuel cell comprising at least:
an assembly having an electrolyte membrane with catalyst layers joined to opposite sides of the electrolyte membrane; and
a pair of separators disposed so as to sandwich the assembly,
wherein:
the assembly generates power with a hydrogen gas fed to one side of the assembly and with an oxidant gas fed to the other side of the assembly,
the separators each have a plurality of projections formed on a side of the assembly so as to form a gas channel through which the hydrogen gas or the oxidant gas flows between the projections, and
the electrolyte membrane has a plurality of through-holes formed at positions facing the projections along a direction in which the projections extend.

2. The fuel cell according to claim 1, wherein
the assembly has a rectangular power generating region in which the catalyst layers are formed so as to sandwich the electrolyte membrane,
the power generating region has long sides and short sides, and
the plurality of projections is disposed along a long side direction of the power generating region.

3. The fuel cell according to claim 2, wherein
the assembly has the power generating region and a non-power generating region that surrounds the power generating region,
the fuel cell has a resin frame in the non-power generating region, the resin frame bonded to the assembly so as to surround the power generating region, and
a plurality of through-holes is further formed on an inner side of the electrolyte membrane along an inner peripheral edge of the resin frame.

4. The fuel cell according to claim 1, wherein the plurality of through-holes each have a pore size of 50 µm or smaller.

* * * * *